US012347953B2

(12) United States Patent
Hart et al.

(10) Patent No.: US 12,347,953 B2
(45) Date of Patent: Jul. 1, 2025

(54) ELECTRICAL POWER CONNECTOR SYSTEM

(71) Applicants: TE Connectivity Solutions GmbH, Schaffhausen (CH); Tyco Electronics UK Ltd, Swindon (GB)

(72) Inventors: Stephen Hart, Middletown, PA (US); Stephen Wiseman, Histon (GB); Brian Patrick Costello, Scotts Valley, CA (US); Cristian S. Regus, Fremont, CA (US); Richard Bruce Lloyd, Fremont, CA (US); Jonathan Roberts, Histon (GB); Peter Goesseringer, Fremont, CA (US)

(73) Assignee: TE CONNECTIVITY SOLUTIONS GMBH et al., Schaffhausen (CH)

( * ) Notice: Subject to any disclaimer, the term of this patent is extended or adjusted under 35 U.S.C. 154(b) by 368 days.

(21) Appl. No.: 18/157,974

(22) Filed: Jan. 23, 2023

(65) Prior Publication Data

US 2024/0250459 A1 Jul. 25, 2024

(51) Int. Cl.
*H01R 12/00* (2006.01)
*H01R 12/72* (2011.01)
*H01R 12/73* (2011.01)

(52) U.S. Cl.
CPC ......... *H01R 12/727* (2013.01); *H01R 12/732* (2013.01); *H01R 2201/06* (2013.01)

(58) Field of Classification Search
CPC ............................ H01R 12/732; H01R 12/727
See application file for complete search history.

(56) References Cited

U.S. PATENT DOCUMENTS

| | | | | |
|---|---|---|---|---|
| 7,416,447 | B1 * | 8/2008 | Chen | H01R 12/727 439/607.05 |
| 9,431,783 | B1 * | 8/2016 | Costello | H01R 12/7088 |
| 9,748,681 | B1 * | 8/2017 | Champion | H01R 12/732 |
| 9,801,301 | B1 * | 10/2017 | Costello | H04Q 1/15 |
| 2024/0250459 | A1 * | 7/2024 | Hart | H01R 12/727 |

* cited by examiner

*Primary Examiner* — Phuong Chi Thi Nguyen

(57) ABSTRACT

An electrical power connector includes a connector housing having a slot at a mating end of the connector housing configured to receive a power distribution assembly. The electrical power connector includes power contacts received in the connector housing configured to be is coupled to a power distribution contact of the power distribution assembly. The electrical power connector includes a monitoring device having a monitoring circuit, a monitoring sensor coupled to the monitoring circuit, and a monitoring transmitter coupled to the monitoring circuit. The monitoring sensor is coupled to the power contact to monitor an operating characteristic of the power contact. The monitoring circuit receives sensor signals from the monitoring sensor and the monitoring transmitter transmits monitoring signals from the monitoring circuit based on the operating characteristic of the power contact to a monitoring network remote from the electrical power connector.

20 Claims, 8 Drawing Sheets

ELECTRICAL POWER CONNECTOR SYSTEM

BACKGROUND OF THE INVENTION

The subject matter herein relates generally to electrical power connectors.

This disclosure generally relates to systems for distributing electrical power from a power supply to electrical devices, such as via a busway or track, to which distribution sub-assemblies or power taps may be removably connected without shutting down the power supply. The busway or track includes multiple conductors, such as busbars, to provide power. Other power distribution systems include power connectors having power contacts to provide power.

Various systems, such as server infrastructures, include DC power connectors which are connecting to a busbar of a data center rack cabinet as part of a power supply. The DC power connector has two poles, i.e. plus and minus, and may be transmitting a current of e.g. 500 Ampere. For contacting an elongated flat busbar where the opposing surfaces are insulated against each other and can be connected to the opposing poles, the DC power connector may be a modified edge connector with spring contacts being pressed onto the busbar contact surface. The DC power connectors are in particular used for power shelves, battery backup unit (BBU) shelves, IT trays/cubby shelves, or server sleds.

Because of the high current, the connector materials heat up. This temperature rise should normally stay within the required limits of the admissible maximum temperature of the respective application. The proper function of the connector highly relies on the proper function of spring beams and that each of the multiple spring beams carry an even load. If one spring beam should have a malfunction, then the remaining spring beams will have to carry additional current load and therefore will heat up more. More heat will result in the risk that the spring properties of the remaining springs will soften and could cause higher contact resistance. This results again in more heat dissipation that limits further current handling and may necessitate fault detection capability or require preventative maintenance and could end up with the result that the cabinet and/or components fail and may catch fire.

There is room for improvement of such an electrical power connector, so that the safety and power distribution efficiency is further enhanced, at the same time providing a robust and cost efficient connector structure.

BRIEF DESCRIPTION OF THE INVENTION

In one embodiment, an electrical power connector is provided and includes a connector housing having a slot at a mating end of the connector housing. The slot is configured to receive a power distribution assembly. The electrical power connector includes a first power contact received in the connector housing at a first side of the slot. The first power contact is coupled to a first power distribution contact of the power distribution assembly. The electrical power connector includes a second power contact received in the connector housing at a second side of the slot. The second power contact is coupled to a second power distribution contact of the power distribution assembly. The electrical power connector includes a monitoring device coupled to the connector housing. The monitoring device includes a monitoring circuit, a monitoring sensor coupled to the monitoring circuit, and a monitoring transmitter coupled to the monitoring circuit. The monitoring sensor is coupled to at least one of the first power contact and/or the second power contact to monitor an operating characteristic of the corresponding power contact. The monitoring circuit receives sensor signals from the monitoring sensor. The monitoring transmitter transmitting monitoring signals from the monitoring circuit associated with the sensor signals based on the operating characteristic of the corresponding power contact to a monitoring network remote from the electrical power connector.

In another embodiment, an electrical component is provided and includes a shelf holding at least one electronic component. The shelf includes a plug end pluggable in an equipment rack and facing a power distribution assembly at a rear of the equipment rack. The electrical component includes an electrical power connector at the plug end of the shelf. The electrical power connector includes a connector housing holding a first power contact and a second power contact. The connector housing has a slot at a mating end of the connector housing configured to receive the power distribution assembly when the shelf is plugged into the equipment rack. The first power contact provided at a first side of the slot to couple to a first power distribution contact of the power distribution assembly. The second power contact provided at a second side of the slot to couple to a second power distribution contact of the power distribution assembly. The electrical power connector includes a monitoring device coupled to the connector housing. The monitoring device includes a monitoring circuit, a monitoring sensor coupled to the monitoring circuit, and a monitoring transmitter coupled to the monitoring circuit. The monitoring sensor is coupled to at least one of the power contacts to monitor an operating characteristic of the corresponding power contact. The monitoring circuit receives sensor signals from the monitoring sensor. The monitoring transmitter transmitting monitoring signals from the monitoring circuit associated with the sensor signals based on the operating characteristic of the corresponding power contact to a monitoring network remote from the electrical power connector.

In a further embodiment, an electrical device is provided and includes an equipment rack having a frame. The frame has a front and a rear. The electrical device includes a power distribution assembly coupled to the rear of the frame. The power distribution assembly includes a first power distribution contact and a second power distribution contact. The electrical device includes an electrical component coupled to the equipment rack and the power distribution assembly. The electrical component includes a shelf holding at least one electronic component. The shelf includes a plug end pluggable into the equipment rack and facing the power distribution assembly. The electrical component includes an electrical power connector at the plug end of the shelf. The electrical power connector includes a connector housing holding a first power contact and a second power contact. The connector housing has a slot at a mating end of the connector housing configured to receive the power distribution assembly when the shelf is plugged into the equipment rack. The first power contact provided at a first side of the slot to couple to the first power distribution contact of the power distribution assembly. The second power contact provided at a second side of the slot to couple to the second power distribution contact of the power distribution assembly. The electrical power connector includes a monitoring device coupled to the connector housing. The monitoring device includes a monitoring circuit, a monitoring sensor coupled to the monitoring circuit, and a monitoring transmitter coupled to the monitoring circuit. The monitoring sensor is coupled to at least one of the power contacts to monitor an operating characteristic of the corresponding power contact. The monitoring circuit receives sensor signals from the monitoring sensor. The monitoring transmitter transmitting monitoring signals from the monitoring circuit associated with the sensor signals based on the operating characteristic of the corresponding power contact to a monitoring network remote from the electrical power connector.

DETAILED DESCRIPTION OF THE INVENTION

Figure 1:
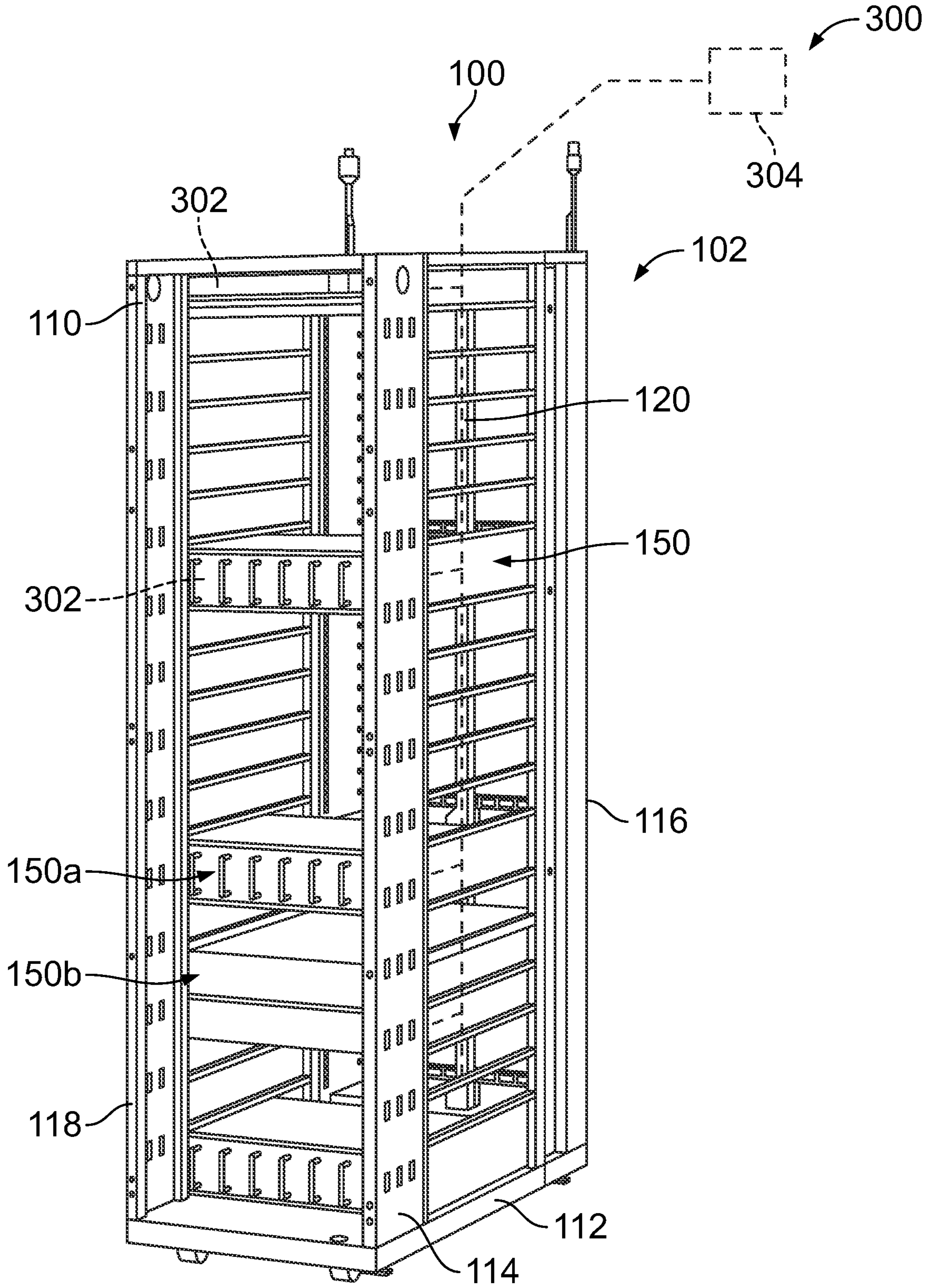
FIG. 1 is a schematic view of a communication system in accordance with an exemplary embodiment, such as for use in a data center.

FIG. 1 is a schematic view of a communication system 100 in accordance with an exemplary embodiment, such as for use in a data center. The communication system 100 includes at least one electrical device 102. The electrical device 102 includes one or more electrical components 150 held in an equipment rack 110, such as a server rack. The electrical device 102 includes a power distribution assembly 120 coupled to the equipment rack 110 to distribute power between the electrical components 150. The electrical components 150 are pluggable into the equipment rack 110 to electrically connect with the power distribution assembly 120.

In an exemplary embodiment, the communication system 100 includes a monitoring network 300 to monitor operating characteristics of one or more of the electrical components 150. For example, the monitoring network 300 may monitor temperature of power distribution elements of the electrical components 150. The monitoring network 300 may monitor current and/or voltage of the power distribution elements of the electrical components 150. The monitoring network 300 may monitor transients of the power distribution elements of the electrical components 150 over time. In an exemplary embodiment, the monitoring network 300 may include at least one local monitoring device 302 at the equipment rack 110. The local monitoring device 302 may operate as a host or master monitoring device for other devices within the monitoring network 300. The local monitoring device 302 may be a top-of-the-rack control unit or other embedded system used to monitor and/or control operation of the system. The local monitoring device 302 may be provided inside one of the electrical components 150. In an exemplary embodiment, the monitoring network 300 may include at least one remote monitoring device 304 remote from the equipment rack 110. The remote monitoring device 304 communicates with the local monitoring device 302 and may communicate with many local monitoring devices 302 of different electrical devices 102, such as multiple equipment racks in a server room. Data relating to operation of the various electrical components 150 may be transmitted to the remote monitoring device 304 for monitoring by an operator. The remote monitoring device 304 may be a computer workstation in various embodiments. The remote monitoring device 304 may be a mobile device, such as a tablet.

The equipment rack 110 includes a frame 112 for supporting a plurality of the electrical components 150. Optionally, the equipment rack 110 may include a cabinet 114 surrounding the frame 112 and the electrical components 150. In an exemplary embodiment, power distribution assembly 120 is coupled to the frame 112 and/or the cabinet 114, such as at a rear 116 of the equipment rack 110. The electrical components 150 are pluggable into the equipment rack 110 at a front 118 of the equipment rack 110.

The electrical components 150 are pluggable devices configured to be loaded into the equipment rack 110. In various embodiments, the electrical components 150 may be power shelves, battery backup unit (BBU) shelves, IT trays/cubby shelves, server sleds, network switches, routers, patch panels, and the like. In other various embodiments, the electrical components 150 may be pluggable drives, memory modules, hard drives, I/O modules, or other types of communication components. In an exemplary embodiment, at least one of the electrical components 150 is a power supply electrical component **150*a*, such as a power shelves, pluggable into the equipment rack 110 to supply power to the power distribution assembly 120. Other electrical components 150 are power receive electrical components 150*b*, such as server shelves, pluggable into the equipment rack 110 to electrically connect to the power distribution assembly 120 and receive power from the power distribution assembly 120 for powering various devices or components on the server shelf. The electrical components 150 may be arranged in a stack either directly on top of each other or with spaces between and coupled to the power distribution assembly 120 at different heights along the power distribution assembly 120. During operation, the power distribution elements of the electrical components 150 are monitored by the monitoring network 300** to avoid damage to the power distribution elements, such as due to over-heating.

Figure 2:
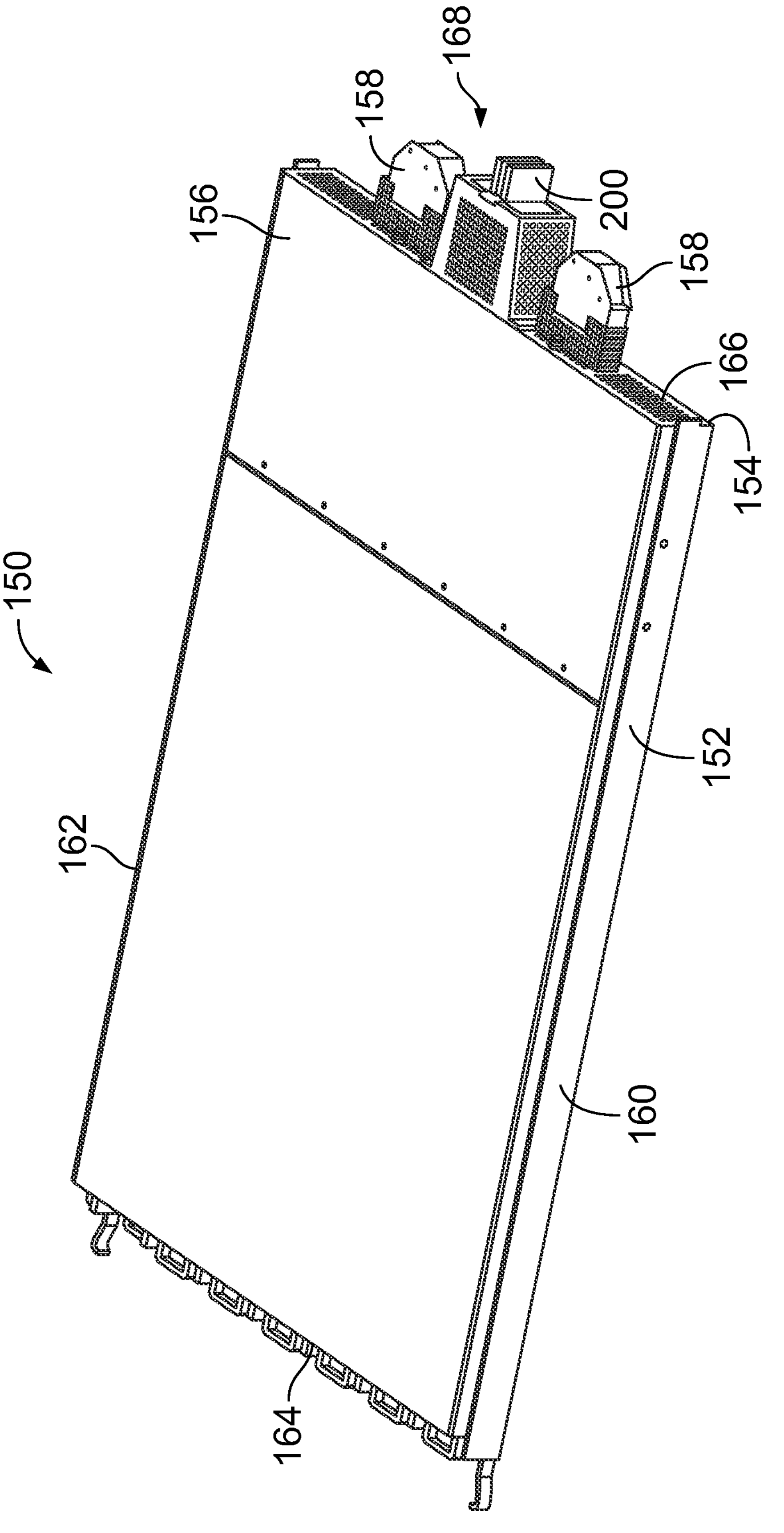
FIG. 2 is a top perspective view of an exemplary electrical component having an electrical power connector in accordance with an exemplary embodiment.
Figure 3:
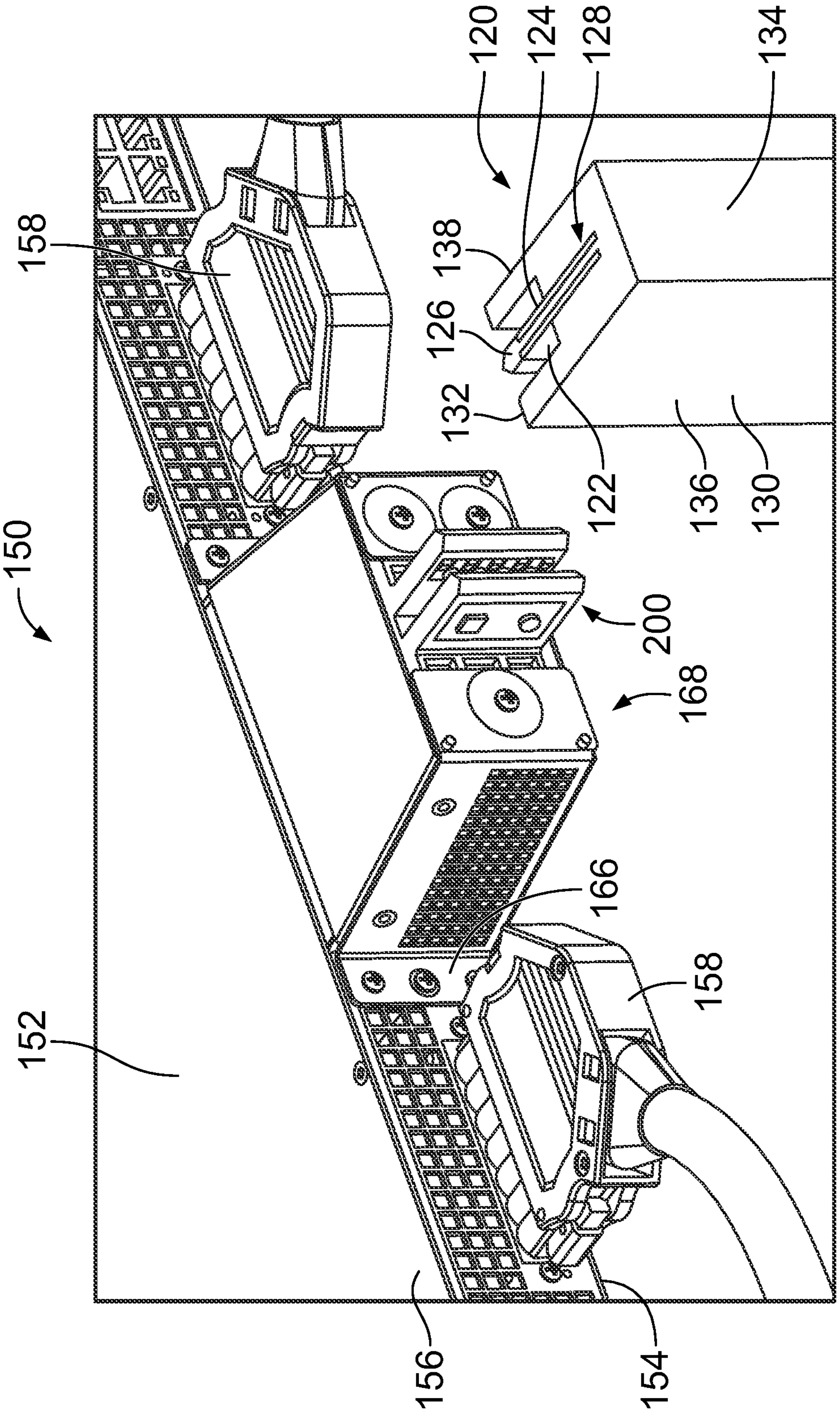
FIG. 3 is a rear perspective view of an exemplary electrical component having an electrical power connector in accordance with an exemplary embodiment.

FIG. 2 is a top perspective view of an exemplary electrical component 150 having an electrical power connector 200 in accordance with an exemplary embodiment. FIG. 3 is a rear perspective view of an exemplary electrical component 150 having an electrical power connector 200 in accordance with an exemplary embodiment. The electrical power connector 200 is configured to be electrically connected to the power distribution assembly 120 (FIG. 3) to supply power to the power distribution assembly 120. The electrical component 150 is a power supply shelf for a data center in the illustrated embodiment; however, the electrical power connector 200 is not limited to use in power supply shelves and may be used in other types of equipment.

The electrical component 150 includes a housing or casing 152 protecting the electronic components (not shown) of the electrical component 150. The electronic components may for instance comprise AC/DC converters for providing a DC power from an AC source. The casing 152 includes a tray or shelf 154 and a cover 156 coupled to the shelf 154. The shelf 154 is used to support the electronic components. The cover 156 is used to cover or enclose the electronic components. The casing 152 has sides 160, 162 extending between a front 164 and a rear 166 of the electrical component 150. The rear 166 defines a plug end 168 of the electrical component 150 that faces the power distribution assembly 120. The electrical power connector 200 is provided at the plug end 168 for mating with the power distribution assembly 120.

In an exemplary embodiment, the AC input power is connected to the electrical component 150 via input connectors 158. The DC power is output via the electrical power connector 200 to the power distribution assembly 120. Various electronic components (e.g. AC/DC converters) are connected to the input connectors 158 via cables or busbars (not shown). Furthermore, a plurality of cables or busbars (not shown) connected to the electronic components are attached to the electrical power connector 200.

The power distribution assembly 120 is shown in cross-section in FIG. 3. In the illustrated embodiment, the power distribution assembly is a busbar assembly. For example, the power distribution assembly 120 is an elongated busbar component used to distribute power between various electrical components 150. However, other types of components may be used for power distribution in alternative embodiments, such as cabled power connectors mated at a separable mating interface.

The power distribution assembly 120 includes a first power distribution contact 122 and a second power distribution contact 124. In various embodiments, the first power distribution contact 122 is a power contact and the second power distribution contact 124 is a ground return contact, or vice versa. In other various embodiments, the first power distribution contact 122 is a positive contact and the second power distribution contact 124 is a negative contact, or vice versa. In an exemplary embodiment, the first power distribution contact 124 is a first busbar and the second power distribution contact is a second busbar.

In an exemplary embodiment, the power distribution assembly 120 includes an isolator panel 126 or other type of isolation between the first power distribution contact 122 and the second power distribution contact 124. The isolator panel 126 is manufactured from a dielectric material, such as a plastic material or a rubber material. The isolator panel 126 electrically isolates the first power distribution contact 122 from the second power distribution contact 124. In the illustrated embodiment, the first and second power distribution contacts 122, 124 together with the isolator panel 126 form a busbar element 128 for powering the various electrical components 150 or receiving power from the various electrical components 150. In an exemplary embodiment, the power distribution assembly 120 is a laminated structure having the first and second power distribution contacts 122, 124 laminated together with the isolator panel 126. However, the power distribution assembly 120 may have other structures in alternative embodiments, such as having the first and second power distribution contacts 122, 124 separate from each other, such as spaced apart by an air gap.

In an exemplary embodiment, the power distribution assembly 120 includes a cage 130 surrounding or covering the busbar element 128. The cage 130 may be coupled to the frame 112 (FIG. 1) of the equipment rack 110 (FIG. 1). In various embodiments, the cage 130 may be a stamped and formed part. For example, the cage 130 may be stamped from a piece of sheet metal and formed into a U-shaped structure having an open front 132. In other various embodiments, the cage 130 may be a molded part. For example, the cage 130 may be overmolded onto the busbar element 128. The cage 130 includes an end wall 134 at the rear of the cage 130 and side walls 136, 138 extending from the end wall 134 to the front 132. The busbar element 128 is located in the space between the side walls 136, 138. The contacts 122, 124 are accessed through the front 132 by the electrical power connector 200. For example, the electrical power connector 200 may be mated with the contacts 122, 124 through the front 132 of the cage 130. The cage 130 covers the contacts 122, 124 to prevent inadvertent touching or short-circuiting with the first and second power distribution contacts 122, 124. The cage 130 may be connected to the chassis ground of the electrical power connector 200, such as connected to the chassis ground clip or other chassis ground contacts.

Figure 4:
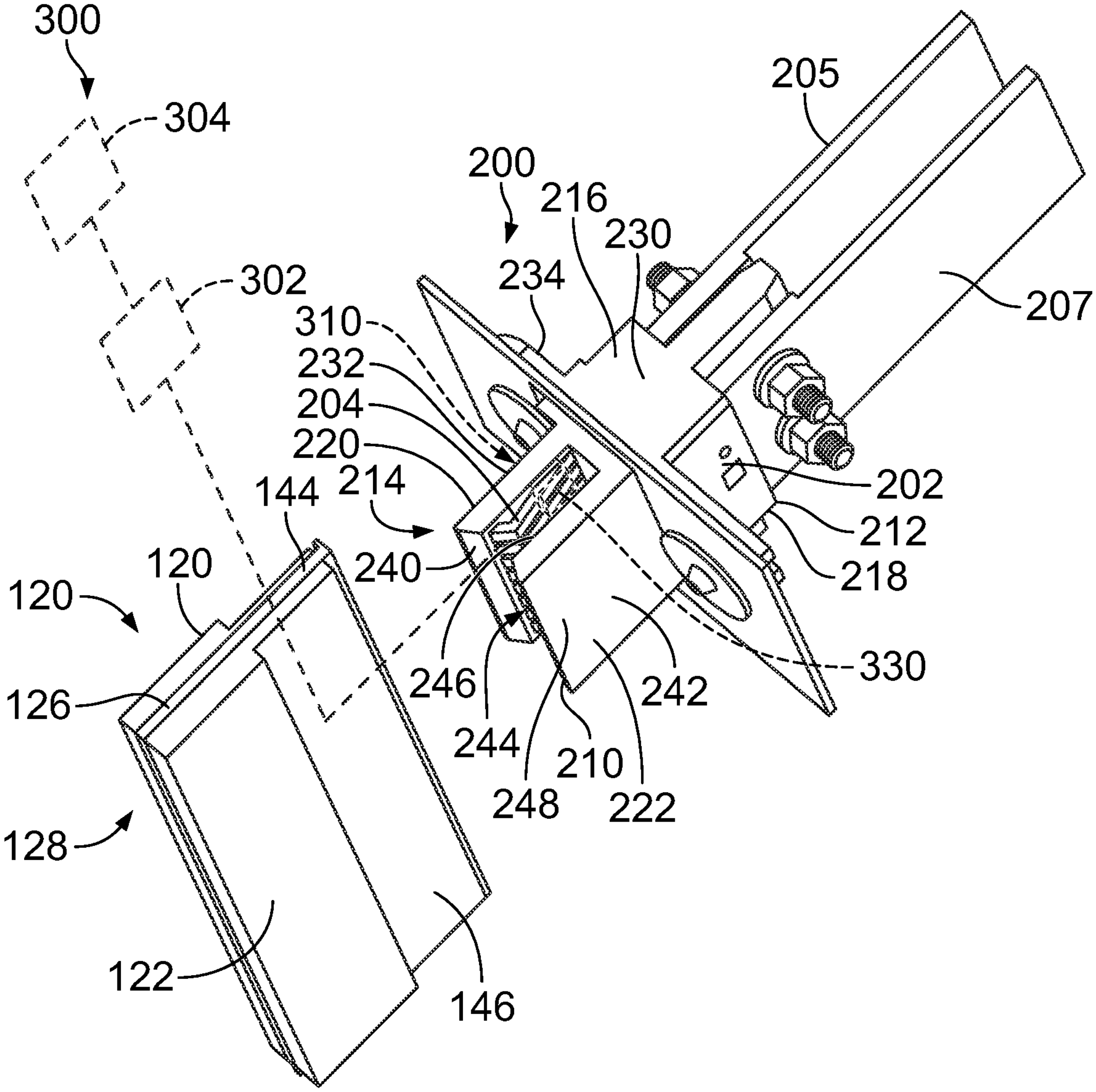
FIG. 4 is a perspective view of the electrical power connector poised for mating with the power distribution assembly in accordance with an exemplary embodiment.
Figure 5:
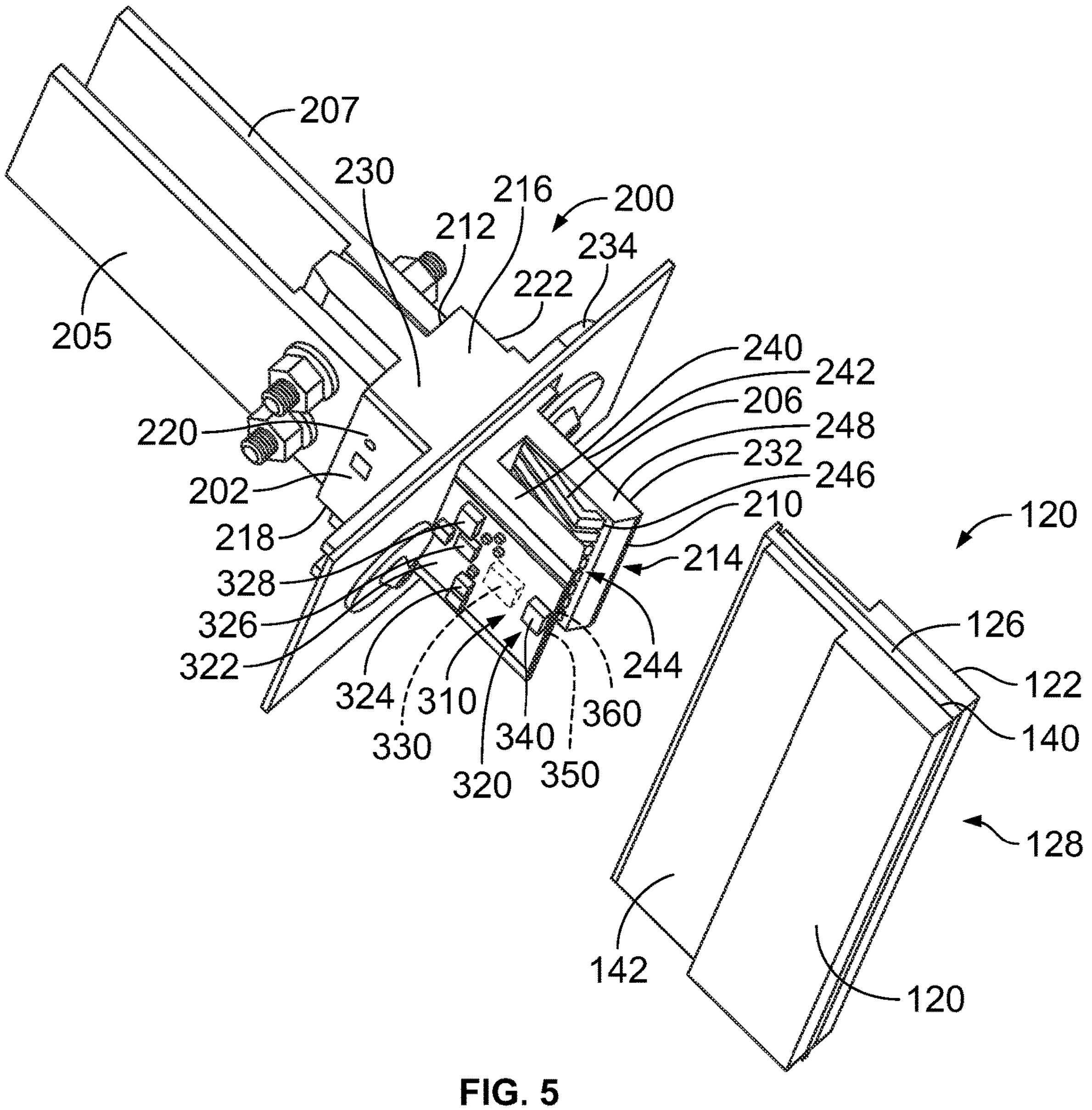
FIG. 5 is another perspective view of the electrical power connector poised for mating with the power distribution assembly in accordance with an exemplary embodiment.

FIG. 4 is a perspective view of the electrical power connector 200 poised for mating with the power distribution assembly 120. FIG. 5 is another perspective view of the electrical power connector 200 poised for mating with the power distribution assembly 120. The busbar element 128 of the power distribution assembly 120 is illustrated in FIGS. 4 and 5 with the cage 130 removed to illustrate the first and second power distribution contacts 122, 124 and the isolator panel 126. The electrical power connector 200 is configured to mate with the busbar element 128 similar to a card edge connector. The isolator panel 126 may extend to the front edge of the busbar element 128 to form a cap and prevent inadvertent touching or shorting of either of the contacts 122, 124 by the electrical power connector 200 during mating.

In an exemplary embodiment, the first power distribution contact 122 is a metal plate having an inner surface 140 and an outer surface 142. The inner surface 140 faces the isolator panel 126. In an exemplary embodiment, the outer surface 142 of the first power distribution contact 122 defines a first electrically conductive surface having one or more mating interface areas for mating with the corresponding electrical power connector 200. In the illustrated embodiment, the mating interface area is located proximate to the front. Optionally, the front end of the first power distribution contact 122 may be thinner and the rear end of the first power distribution contact 122 may be wider. The first power distribution contact 122 may have other shapes in alternative embodiments, such as being a power pin or power socket type contact. The first power distribution contact 122 may have deflectable spring fingers in other various embodiments.

In an exemplary embodiment, the second power distribution contact 124 is a metal plate having an inner surface 144 and an outer surface 146. The inner surface 144 faces the isolator panel 126. In an exemplary embodiment, the outer surface 146 of the second power distribution contact 124 defines a second electrically conductive surface having one or more mating interface areas for mating with the corresponding electrical power connector 200. In the illustrated embodiment, the mating interface area is located proximate to the front. The second electrically conductive surface is arranged on the opposite side of the busbar element 128 from the first electrically conductive surface. Optionally, the front end of the second power distribution contact 124 may be thinner and the rear end of the second power distribution contact 124 may be wider. The second power distribution contact 124 may have other shapes in alternative embodiments, such as being a power pin or power socket type contact. The second power distribution contact 124 may have deflectable spring fingers in other various embodiments.

The electrical power connector 200 includes a connector housing 202 holding a first power contact 204 (FIG. 4) and a second power contact 206 (FIG. 5). The first and second power contacts 204, 206 may be similar and include similar features, such as being identical or mirrored versions of each other. A first busbar 205 is coupled to the first power contact 204 and a second busbar 207 is coupled to the second power contact 206. However, in alternative embodiments, power cables (not shown) may be connected to the power contacts 204, 206 rather than the busbars 205, 207 to supply power to the power contacts 204, 206.

The first and second power contacts 204, 206 are configured to be electrically connected to the power distribution assembly 120. For example, the power contacts 204, 206 are configured to be electrically connected to the first and second power distribution contacts 122, 124, respectively. In an exemplary embodiment, each power contact 204, 206 includes a mating end 208 opposite the terminated end terminated to the busbars 205, 207 (or the power cables). The mating end 208 may include spring beams or other types of contacts defining a mating interface for mating with the power distribution assembly 120. The terminated ends are configured to be terminated to the busbars 205, 207, such as being bolted or welded to the ends of the busbars 205, 207.

Figure 6:
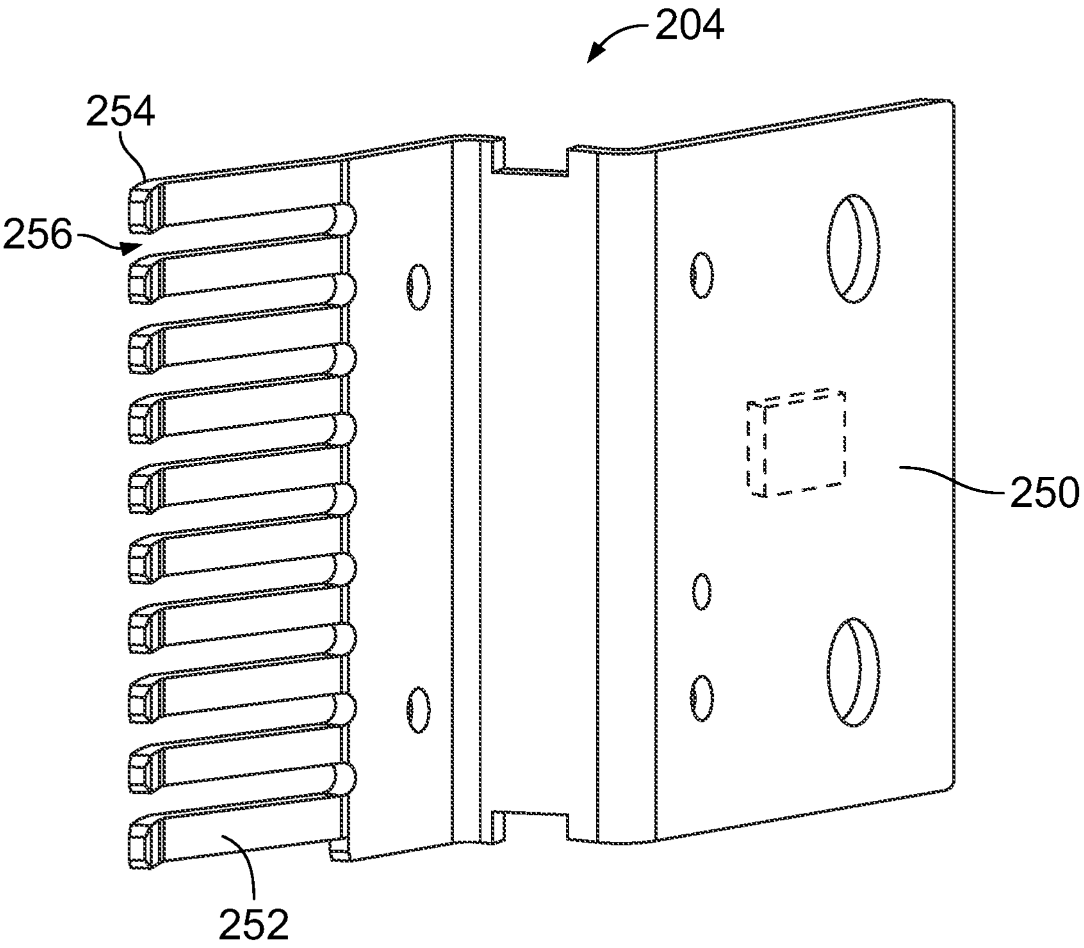
FIG. 6 is a perspective view of the first power contact in accordance with an exemplary embodiment.

FIG. 6 is a perspective view of the first power contact 204 in accordance with an exemplary embodiment; however, the second power contact 206 (FIG. 5) may include like elements and features identified by like reference numerals. In an exemplary embodiment, the power contact 204 is a stamped and formed part. The power contact 204 includes a contact plate 250 and a plurality of spring contact elements 252 at a mating end of the power contact 204. The spring contact elements 252 are arranged in a row. Each spring contact element 252 includes a contact region 254 defining a point of contact with the power distribution contact 122 (FIG. 5). The spring contact elements 252 may be arranged equidistantly. The spring contact elements 252 may be separated by small gaps 256. The spring contact elements 252 are independently deflectable.

In an exemplary embodiment, a monitoring sensor (shown in phantom) may be connected to the power contact 204 to monitor an operating characteristic of the power contact 204, such as a temperature, current, voltage, or other characteristic of the power contact 204. The monitoring sensor may be coupled to the contact plate 250 or one of the spring contact elements 252. The monitoring sensor may be directly coupled to the power contact 204. Alternatively, the monitoring sensor may be indirectly coupled to the power contact 204.

Returning to FIGS. 4 and 5, the first and second power contacts 204, 206 are held in the connector housing 202. The connector housing 202 includes a front 210 and a rear 212. The front 210 defines a mating end 214 configured to be mated with the power distribution assembly 120. The busbars 205, 207 extend from the rear 212 of the connector housing 202. However, the electrical power connector 200 may be a right-angle connector in alternative embodiments having the busbars 205, 207 extending from a top 216 or a bottom 218 of the connector housing 202 or extending from a first side 220 or a second side 222 of the connector housing 202.

In an exemplary embodiment, the connector housing 202 includes a base 230 at the rear 212 and a plug 232 at the front 210. The connector housing 202 includes a flange 234 extending from the base 230. In various embodiments, the flange 234 may extend from the base 230 at the sides 220, 222. In other various embodiments, the flange 234 may extend from the base 230 at the top 216 and/or the bottom 218. The flange 234 is used for mounting the electrical power connector 200 to the casing 152 (FIG. 2). The base 230 is located rearward of the flange 234, and is thus configured to extend into the casing 152. The plug 232 extends forward of the flange 234, and thus is configured to be located rearward of the casing 152 for mating with the power distribution assembly 120. For example, the plug 232 may be plugged into the power distribution assembly 120 to mate with the contacts 122, 124.

In an exemplary embodiment, the plug 232 includes a first plug wall 240 and a second plug wall 242 forming a slot 244 therebetween. Each of the plug walls 240, 242 include an interior surface 246 and an exterior surface 248. The interior surface 246 faces the slot 244. The slot 244 is open at the front 210 to receive the contacts 122, 124. The contacts 204, 206 are exposed within the slot 244 for mating with the corresponding first and second power distribution contacts 122, 124. For example, the contacts 204, 206 extend along the interior surfaces 246 of the corresponding plug walls 240, 242. In the illustrated embodiment, the slot 244 extends vertically from the top 216 to the bottom 218. For example, the slot 244 is open at the top 216 and open at the bottom 218. The slot 244 may have other shapes in alternative embodiments. In other alternative embodiments, a plurality of the slots 244 may be provided, such as individual slots for each of the contacts 204, 206. In the illustrated embodiment, the plug walls 240, 242 are oriented vertically and provided at the first side 220 and the second side 222 of the plug 232. Additional plug walls may be provided in alternative embodiments.

In an exemplary embodiment, the electrical power connector 200 includes a monitoring device 310, which forms part of the monitoring network 300 (FIG. 1). The monitoring device 310 monitors operating characteristics of at least one of the first and second power contacts 204, 206. For example, the monitoring device 310 may monitor a temperature of the first power contact 204. The monitoring device 310 may monitor current and/or voltage of the first power contact 204. The monitoring device 310 may monitor transients of the first power contact 204 over time. In order to be aware of any rise in temperature which gives an early indication of an impending failure, the electrical power connector 200 is provided with the monitoring device 310 to monitor the power contact 204. The monitoring device 310 registers a rise in temperature at a very early stage of a deterioration of the power contact 204. The output signal of the monitoring device 310 can be used to generate a warning signal long before damage occurs.

The monitoring device 310 is coupled to the connector housing 202. The monitoring device 310 is coupled to the first power contact 204 and/or the second power contact 206. In an exemplary embodiment, the monitoring device 310 includes a monitoring circuit 320, a monitoring sensor 330 coupled to the monitoring circuit 320, and a monitoring transmitter 340 coupled to the monitoring circuit 320.

The monitoring sensor 330 is coupled to the power contact 204 to monitor an operating characteristic of the power contact 204. The monitoring sensor 330 may include an analog-digital-converter for generating a sensor signal. The output sensor signal may be a digital output signal. In various embodiments, the monitoring sensor 330 may directly engage the power contact 204. In an exemplary embodiment, the monitoring sensor 330 is a temperature sensor for monitoring a temperature or temperature rise or change in temperature of the power contact 204. In various embodiments, the temperature sensor is a thermocouple. However, other types of temperature sensors may be used in alternative embodiments. For example, the temperature sensor may be a micro thermistor probe, an NTC sensor, a resistive temperature detector (RTD), a thermistor, a silicon-based temperature sensor, and the like. In other embodiments, the monitoring sensor 330 is a current sensor. For example, the current sensor may be a magnetic sensor, a shunt resistor, an electromagnetic current transformer, an electronic current transformer, and the like. The current sensor may measure DC current through the power contact 204. In other embodiments, the monitoring sensor 330 is a voltage sensor. For example, the voltage sensor may be a resistive sensor having voltage divider and a bridge circuit, a capacitor sensor, and the like. The voltage sensor may measure AC voltage or DC voltage through the power contact 204.

The monitoring circuit 320 is coupled to the connector housing 202, such as to the outer surface of the plug wall 240. The monitoring circuit 320 may extend along the power contact 204. The monitoring circuit 320 may be coupled to another area of the connector housing 202 in alternative embodiments. The connector housing 202 may enclose or surround the monitoring circuit 320 in alternative embodiments. The monitoring circuit 320 receives the sensor signals from the monitoring sensor 330. The monitoring circuit 320 analyzes the sensor signals to generate monitoring signals. In an exemplary embodiment, the monitoring circuit 320 includes a circuit board 322 and electronic components 324. The electronic components 324 may include resistors, inductors, capacitors. The electronic components 324 may include processors, memories, chips, integrated circuits, or other types of electronic components. In an exemplary embodiment, the monitoring circuit 320 includes a coupling network 326 electrically connected between the monitoring transmitter 340 and the power contact 204 to facilitate powerline transmission of signals on the power distribution assembly 120. The coupling network 326 may include one or more circuit components, such as a coupling capacitor. In an exemplary embodiment, the monitoring circuit 320 includes an electronic control unit 328 electrically connected to the monitoring transmitter 340. The electronic control unit 328 communicates with the monitoring transmitter 340. For example, the electronic control unit 328 may send the monitoring signals to the monitoring transmitter 340 for transmission from the monitoring device 310. The monitoring signals may be RF signals in various embodiments. In an exemplary embodiment, the monitoring circuit 320 includes an analog-to-digital converter for converting between analog and digital signals.

The monitoring circuit 320 receives inputs, such as the sensor signals. The monitoring circuit 320 analyzes the sensor signals to determine an operating characteristic of the power contact 204. For example, the monitoring circuit 320 analyzes the sensor signals to determine a temperature of the power contact 204 or other operating characteristic, such as the current, voltage or transients of the power contact 204. The monitoring circuit 320 generates at least one output. For example, the monitoring circuit 320 generates the monitoring signals, which may be transmitted to the local monitoring device 302 (FIG. 1) and/or the remote monitoring device 304. In an exemplary embodiment, the monitoring signals are transmitted from the monitoring circuit 320 by the monitoring transmitter 340.

The monitoring transmitter 340 is configured to transmit outputs to the monitoring network 300. In an exemplary embodiment, the monitoring transmitter 340 is coupled to the monitoring circuit 320. For example, the monitoring transmitter 340 may be mounted to the circuit board 322. The monitoring transmitter 340 may be an RF transmitter. In an exemplary embodiment, the monitoring transmitter 340 may be a powerline transmitter configured to transmit the monitoring signals on the power distribution assembly 120. For example, the monitoring transmitter 340 may transmit the monitoring signals through the power contact 204 to the power distribution contact 122 of the power distribution assembly 120.

In an exemplary embodiment, the monitoring device 310 includes a monitoring receiver 350 coupled to the monitoring circuit 320. The monitoring receiver 350 is configured to receive inputs from the monitoring network 300. In an exemplary embodiment, the monitoring receiver 350 is coupled to the monitoring circuit 320. For example, the monitoring receiver 350 may be mounted to the circuit board 322. The monitoring receiver 350 may be an RF receiver. In an exemplary embodiment, the monitoring receiver 350 may be a powerline receiver configured to receive inputs or signals from the power distribution assembly 120. For example, the monitoring receiver 350 may receive the inputs or signals from the power distribution contact 122 of the power distribution assembly 120 through the power contact 204.

In an exemplary embodiment, the monitoring device 310 includes a monitoring transceiver 360 coupled to the monitoring circuit 320. The monitoring transceiver 360 forms the monitoring transmitter 340 and the monitoring receiver 350.

Figure 7:
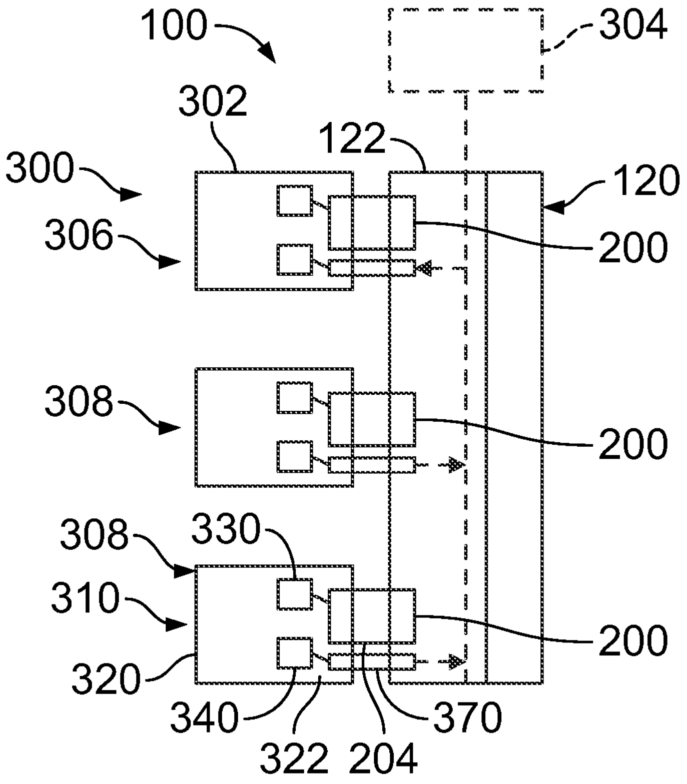
FIG. 7 is a schematic view of the monitoring network in accordance with an exemplary embodiment.

FIG. 7 is a schematic view of the monitoring network 300 in accordance with an exemplary embodiment. FIG. 7 illustrates a plurality of the electrical power connectors 200 coupled to the power distribution assembly 120. The electrical power connectors 200 use powerline transmission of signals on the power distribution assembly 120. The monitoring transmitters 340 communicate the monitoring signals from the monitoring circuits 320 to the power distribution contact 122 of the power distribution assembly 120.

The monitoring device 310 includes the monitoring sensor 330, which is coupled to the power contact 204 to monitor an operating characteristic of the power contact 204. For example, the monitoring sensor may monitor the temperature, current, voltage, transients, or other characteristics of the power contact 204. The sensor signals from the monitoring sensor 330 are analyzed or processed by the monitoring circuit 320. The monitoring signals from the monitoring circuit 320 are then transmitted onto the power distribution contact 122 of the power distribution assembly 120 by the monitoring transmitter 340.

In an exemplary embodiment, the monitoring device 310 includes a monitoring contact 370 electrically connected to the monitoring transmitter 340. The monitoring contact 370 may be terminated to the circuit board 322. The monitoring contact 370 is received in the connector housing 202 (FIG. 6), such as at the first side of the slot 244 (FIG. 6). The monitoring contact 370 is configured to be electrically coupled to the first power distribution contact 122 of the power distribution assembly 120. For example, a mating end of the monitoring contact 370 may be connected to the first power contact 204, which is electrically connected to the first power distribution contact 122. In other embodiments, the mating end of the monitoring contact 370 may be directly connected to the first power distribution contact 122. The monitoring signals are transmitted through the monitoring contact 370 to the first power distribution contact 122, either directly or through the first power contact 204.

In an exemplary embodiment, one of the local monitoring devices 302 of the monitoring network 300 defines a master monitoring device 306 while the other monitoring devices 310 of the monitoring network 300 define slave monitoring devices 308. The master monitoring device 306 communicates with each of the slave monitoring devices 308. The monitoring signals from each of the slave monitoring devices 308 are transmitted (for example, power line transmission) to the master monitoring device 306 through the power distribution contact 122 of the power distribution assembly 120. The master monitoring device 306 may communicate signals to the slave monitoring devices 308, such as to control operation of the slave monitoring devices 308. Such control signals may be transmitted (for example, powerline transmission) on the power distribution contact 122 of the power distribution assembly 120. The master monitoring device 306 may communicate with the remote monitoring device 304 of the monitoring network 300, such as to transmit the monitoring signals from any of the slave monitoring devices 308 to the remote monitoring device 304.

The monitoring signals, relating to temperature, current, voltage, or other operating characteristics of the power contact 204, can be used for diagnostics of the health or operation of the components of the system 100. The system 100 may include an alarm system. In case of failure, the alarm system may be operated, such as to provide an indication to the operator and/or switch off the power to the components to avoid damage. The monitoring signals may be compared to a predefined threshold value, and the warning signal is generated if the monitoring signal exceeds the threshold value. In order to create an early warning system, this threshold can be chosen to be much lower than the actual admissible maximum temperature of the connector components. A predictive maintenance of the components can be achieved, enhancing the safety of the operation of the system.

Figure 8:
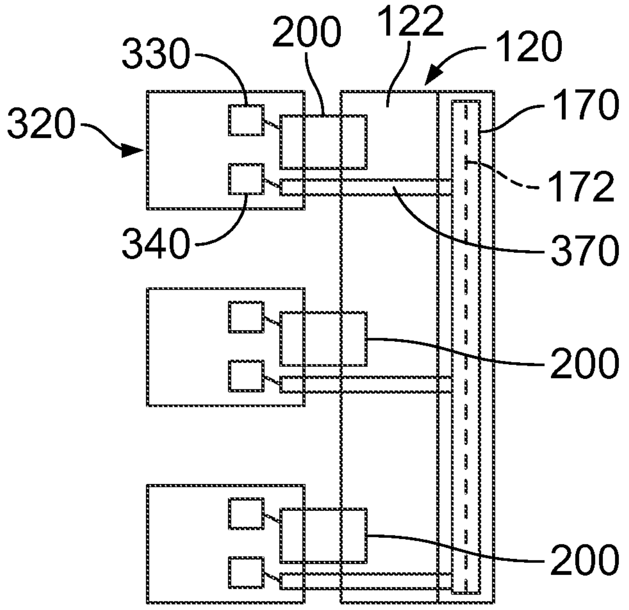
FIG. 8 is a schematic view of the monitoring network in accordance with an exemplary embodiment.

FIG. 8 is a schematic view of the monitoring network 300 in accordance with an exemplary embodiment. FIG. 8 illustrates a plurality of the electrical power connectors 200 coupled to the power distribution assembly 120. In an exemplary embodiment, the power distribution assembly 120 includes a microstrip line 170 provided on the power distribution contact 122. The microstrip line 170 extends vertically along the power distribution contact 122. The microstrip line 170 includes at least one microstrip circuit 172.

The electrical power connectors 200 are configured to be electrically connected to the circuit of the microstrip line to transmit the monitoring signals on the power distribution assembly 120. The monitoring transmitters 340 communicate the monitoring signals from the monitoring circuits 320 to the microstrip circuit 172 of the microstrip line 170. For example, the monitoring contact 370 is configured to be electrically coupled to the microstrip line 170 of the power distribution assembly 120. The mating end of the monitoring contact 370 may be connected to the microstrip circuit 172 of the microstrip line 170. The monitoring signals are transmitted through the monitoring contact 370 to the microstrip circuit 172.

Figure 9:
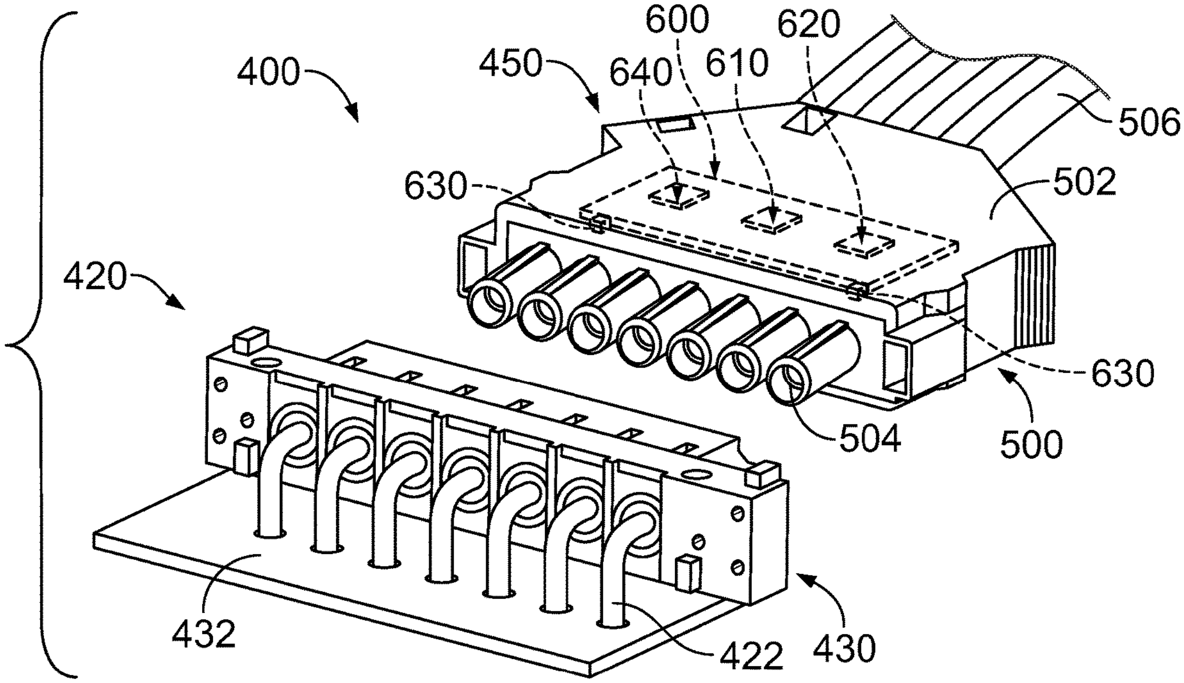
FIG. 9 is a top perspective view of a power connector system having an electrical component configured to be mated with a power distribution assembly in accordance with an exemplary embodiment.

FIG. 9 is a top perspective view of a power connector system 400 having an electrical component 450 configured to be mated with a power distribution assembly 420 in accordance with an exemplary embodiment. The electrical component 450 includes an electrical power connector 500 configured to be mated with the power distribution assembly 420, which supplies power to the power distribution assembly 420. In the illustrated embodiment, the electrical power connector 500 is a cable power connector having power cables routed to another location or component. The power distribution assembly 420 includes a header power connector 430 mounted to a substrate 432, such as a busbar, a circuit board, or another power distribution component. The header power connector 430 of the power distribution assembly 420 includes power distribution contacts 422 coupled to the substrate 432.

The electrical power connector 500 includes a connector housing 502 holding power contacts 504. The power contacts 504 are terminated to corresponding power cables 506. In the illustrated embodiment, the power contacts 504 are socket contacts configured to receive the power distribution contacts 422, which may be pin contacts. In an exemplary embodiment, a monitoring sensor 630 (shown in phantom) may be connected to one or more of the power contact 504 to monitor an operating characteristic of the power contact 504, such as a temperature, current, voltage, or other characteristic of the power contact 504.

In an exemplary embodiment, the electrical power connector 500 includes a monitoring device 610, which forms part of a monitoring network 600. The monitoring device 610 monitors operating characteristics of at least one of the power contacts 504. For example, the monitoring device 610 may monitor a temperature of the power contact 504. The monitoring device 610 may monitor current and/or voltage of the power contact 504. The monitoring device 610 may monitor transients of the power contact 504 over time. In order to be aware of any rise in temperature which gives an early indication of an impending failure, the electrical power connector 500 is provided with the monitoring device 610 to monitor the power contact 504. The monitoring device 610 registers a rise in temperature at a very early stage of a deterioration of the power contact 504. The output signal of the monitoring device 610 can be used to generate a warning signal long before damage occurs.

The monitoring device 610 is coupled to the connector housing 502. In an exemplary embodiment, the monitoring device 610 includes a monitoring circuit 620, the monitoring sensor 630 coupled to the monitoring circuit 620, and a monitoring transmitter 640 coupled to the monitoring circuit 620.

The monitoring circuit 620 receives the sensor signals from the monitoring sensor 630. The monitoring circuit 620 analyzes the sensor signals to generate monitoring signals. The monitoring circuit 620 may include a circuit board, electronic components, and a coupling network electrically connected between the monitoring transmitter 640 and the power contact 504 to facilitate powerline transmission of signals on the power distribution assembly 420. The monitoring circuit 620 may include an electronic control unit electrically connected to the monitoring transmitter 640 to send the monitoring signals to the monitoring transmitter 640 for transmission from the monitoring device 610. The monitoring signals may be RF signals in various embodiments. The monitoring circuit 620 may include an analog-to-digital converter for converting between analog and digital signals.

The monitoring transmitter 640 may be an RF transmitter. In an exemplary embodiment, the monitoring transmitter 640 may be a powerline transmitter configured to transmit the monitoring signals on the power distribution assembly 420. For example, the monitoring transmitter 640 may transmit the monitoring signals through the power contact 504 to the power distribution contact 422 of the power distribution assembly 420. In an exemplary embodiment, the monitoring device 610 may include a monitoring receiver coupled to the monitoring circuit 620.

Figure 10:
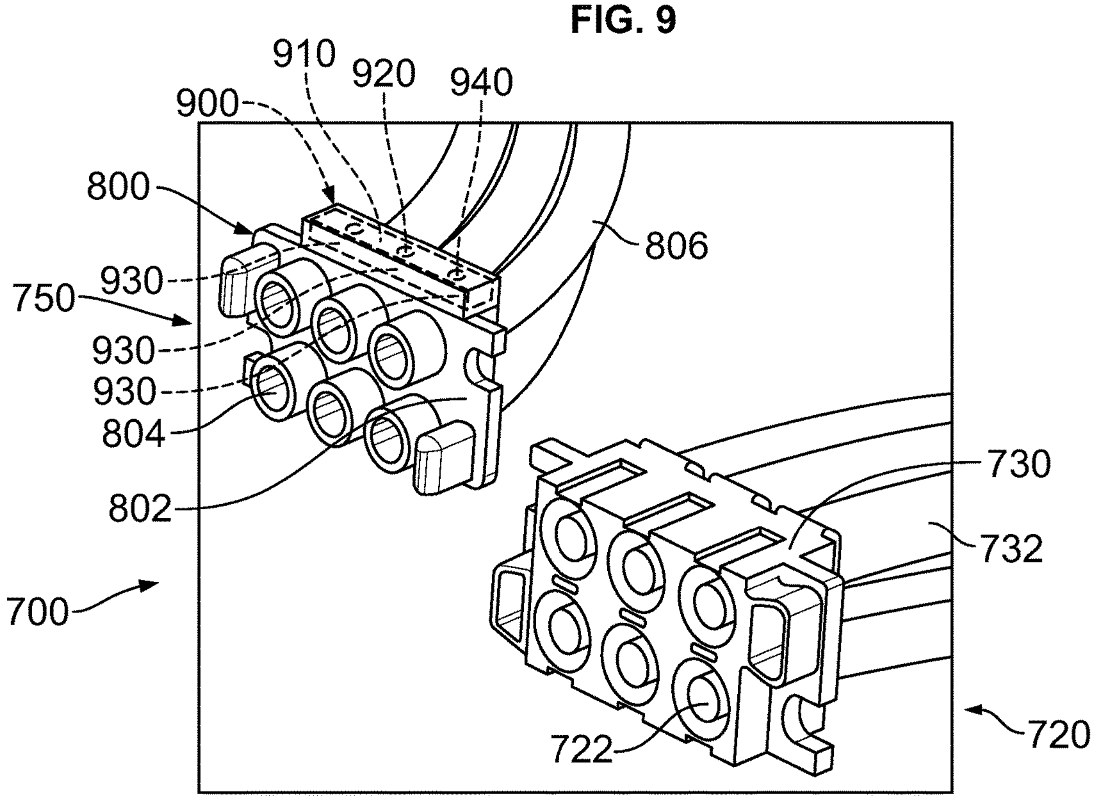
FIG. 10 is a top perspective view of a power connector system having an electrical component configured to be mated with a power distribution assembly in accordance with an exemplary embodiment.

FIG. 10 is a top perspective view of a power connector system 700 having an electrical component 750 configured to be mated with a power distribution assembly 720 in accordance with an exemplary embodiment. The electrical component 750 includes an electrical power connector 800 configured to be mated with the power distribution assembly 720, which supplies power to the power distribution assembly 720. In the illustrated embodiment, the electrical power connector 800 is a cable power connector having power cables routed to another location or component. In the illustrated embodiment, the power distribution assembly 720 includes a cable power connector 730. The cable power connector 730 of the power distribution assembly 720 includes power distribution contacts 722 terminated to corresponding power cables 732.

The electrical power connector 800 includes a connector housing 802 holding power contacts 804. The power contacts 804 are terminated to corresponding power cables 806. In the illustrated embodiment, the power contacts 804 are socket contacts configured to receive the power distribution contacts 722, which may be pin contacts. In an exemplary embodiment, a monitoring sensor 930 (shown in phantom) may be connected to one or more of the power contact 804 to monitor an operating characteristic of the power contact 804, such as a temperature, current, voltage, or other characteristic of the power contact 804.

In an exemplary embodiment, the electrical power connector 800 includes a monitoring device 910, which forms part of a monitoring network 900. The monitoring device 910 monitors operating characteristics of at least one of the power contacts 804. For example, the monitoring device 910 may monitor a temperature of the power contact 804. The monitoring device 910 may monitor current and/or voltage of the power contact 804. The monitoring device 910 may monitor transients of the power contact 804 over time. In order to be aware of any rise in temperature which gives an early indication of an impending failure, the electrical power connector 800 is provided with the monitoring device 910 to monitor the power contact 804. The monitoring device 910 registers a rise in temperature at a very early stage of a deterioration of the power contact 804. The output signal of the monitoring device 910 can be used to generate a warning signal long before damage occurs.

The monitoring device 910 is coupled to the connector housing 802. In an exemplary embodiment, the monitoring device 910 includes a monitoring circuit 920, the monitoring sensor 930 coupled to the monitoring circuit 920, and a monitoring transmitter 940 coupled to the monitoring circuit 920.

The monitoring circuit 920 receives the sensor signals from the monitoring sensor 930. The monitoring circuit 920 analyzes the sensor signals to generate monitoring signals. The monitoring circuit 920 may include a circuit board, electronic components, and a coupling network electrically connected between the monitoring transmitter 940 and the power contact 804 to facilitate powerline transmission of signals on the power distribution assembly 720. The monitoring circuit 920 may include an electronic control unit electrically connected to the monitoring transmitter 940 to send the monitoring signals to the monitoring transmitter 940 for transmission from the monitoring device 910. The monitoring signals may be RF signals in various embodiments. The monitoring circuit 920 may include an analog-to-digital converter for converting between analog and digital signals.

The monitoring transmitter 940 may be an RF transmitter. In an exemplary embodiment, the monitoring transmitter 940 may be a powerline transmitter configured to transmit the monitoring signals on the power distribution assembly 720. For example, the monitoring transmitter 940 may transmit the monitoring signals through the power contact 804 to the power distribution contact 722 of the power distribution assembly 720. In an exemplary embodiment, the monitoring device 910 may include a monitoring receiver coupled to the monitoring circuit 920.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical power connector comprising:

a connector housing having a slot at a mating end of the connector housing, the slot configured to receive a power distribution assembly;

a first power contact received in the connector housing at a first side of the slot, the first power contact configured to be coupled to a first power distribution contact of the power distribution assembly;

a second power contact received in the connector housing at a second side of the slot, the second power contact configured to be coupled to a second power distribution contact of the power distribution assembly; and a monitoring device coupled to the connector housing, the monitoring device including a monitoring circuit, a monitoring sensor coupled to the monitoring circuit, and a monitoring transmitter coupled to the monitoring circuit, the monitoring sensor coupled to the first power contact to monitor an operating characteristic of the first power contact, the monitoring circuit receiving sensor signals from the monitoring sensor, the monitoring transmitter transmitting monitoring signals from the monitoring circuit associated with the sensor signals based on the operating characteristic of the first power contact to a monitoring network remote from the electrical power connector.

2. The electrical power connector of claim 1, wherein the monitoring transmitter is a power line transmitter configured to transmit the monitoring signals on the power distribution assembly.

3. The electrical power connector of claim 1, wherein the monitoring transmitter transmits the monitoring signals through the first power contact to the first power distribution contact.

4. The electrical power connector of claim 1, wherein the monitoring device is configured to communicate with a second monitoring device of a second electrical power connector through the power distribution assembly.

5. The electrical power connector of claim 1, wherein the monitoring sensor comprises a temperature sensor configured to monitor a temperature of the first power contact.

6. The electrical power connector of claim 1, wherein the monitoring sensor comprises at least one of a current sensor and a voltage sensor configured to monitor a current or a voltage, respectively, of the first power contact.

7. The electrical power connector of claim 1, wherein the monitoring circuit includes a coupling network and an electronic control unit, the monitoring transmitter connected between the coupling network and the electronic control unit.

8. The electrical power connector of claim 1, wherein the monitoring circuit includes an analog-to-digital converter.

9. The electrical power connector of claim 1, wherein the monitoring device further comprises a monitoring contact electrically connected to the monitoring transmitter, the monitoring contact received in the connector housing at the first side of the slot, the monitoring contact configured to be coupled to the first power distribution contact of the power distribution assembly.

10. The electrical power connector of claim 1, wherein the monitoring device further comprises a monitoring contact electrically connected to the monitoring transmitter, the monitoring contact received in the connector housing, the monitoring contact configured to be coupled to a monitoring circuit of the power distribution assembly.

11. The electrical power connector of claim 1, wherein the monitoring device further comprises a monitoring receiver coupled to the monitoring circuit, the monitoring receiver configured to receive inputs from the monitoring network.

12. The electrical power connector of claim 11, wherein the monitoring receiver is a power line receiver configured to receive the inputs from the power distribution assembly.

13. The electrical power connector of claim 11, wherein the monitoring receiver receives the monitoring signals from the first power distribution contact through the first power contact.

14. The electrical power connector of claim 11, wherein the monitoring device comprises a monitoring transceiver forming the monitoring transmitter and the monitoring receiver.

15. An electrical component comprising:

a shelf holding at least one electronic component, the shelf including a plug end configured to be received in an equipment rack and face a power distribution assembly at a rear of the equipment rack; and an electrical power connector at the plug end of the shelf, the electrical power connector including a connector housing holding a first power contact and a second power contact, the connector housing having a slot at a mating end of the connector housing configured to receive the power distribution assembly when the shelf is plugged into the equipment rack, the first power contact provided at a first side of the slot to couple to a first power distribution contact of the power distribution assembly, the second power contact provided at a second side of the slot to couple to a second power distribution contact of the power distribution assembly, the electrical power connector including a monitoring device coupled to the connector housing, the monitoring device including a monitoring circuit, a monitoring sensor coupled to the monitoring circuit, and a monitoring transmitter coupled to the monitoring circuit, the monitoring sensor coupled to the first power contact to monitor an operating characteristic of the first power contact, the monitoring circuit receiving sensor signals from the monitoring sensor, the monitoring transmitter transmitting monitoring signals from the monitoring circuit associated with the sensor signals based on the operating characteristic of the first power contact to a monitoring network remote from the electrical power connector.

16. An electrical device comprising:

an equipment rack having a frame, the frame having a front and a rear;

a power distribution assembly coupled to the rear of the frame, the power distribution assembly including a first power distribution contact and a second power distribution contact; and an electrical component coupled to the equipment rack and the power distribution assembly, the electrical component including a shelf holding at least one electronic component, the shelf including a plug end configured to be received in the equipment rack and face the power distribution assembly, the electrical component including an electrical power connector at the plug end of the shelf, the electrical power connector including a connector housing holding a first power contact and a second power contact, the connector housing having a slot at a mating end of the connector housing configured to receive the power distribution assembly when the shelf is plugged into the equipment rack, the first power contact provided at a first side of the slot to couple to the first power distribution contact of the power distribution assembly, the second power contact provided at a second side of the slot to couple to the second power distribution contact of the power distribution assembly, the electrical power connector including a monitoring device coupled to the connector housing, the monitoring device including a monitoring circuit, a monitoring sensor coupled to the monitoring circuit, and a monitoring transmitter coupled to the monitoring circuit, the monitoring sensor coupled to the first power contact to monitor an operating characteristic of the first power contact, the monitoring circuit receiving sensor signals from the monitoring sensor, the monitoring transmitter transmitting monitoring signals from the monitoring circuit associated with the sensor signals based on the operating characteristic of the first power contact to a monitoring network remote from the electrical power connector.

17. The electrical device of claim 16, wherein the electrical power connector supplies power to the power distribution assembly.

18. The electrical device of claim 16, wherein the monitoring transmitter is a power line transmitter configured to transmit the monitoring signals on the power distribution assembly.

19. The electrical device of claim 16, further comprising:

a second electrical component coupled to the equipment rack and the power distribution assembly, the second electrical component including a second shelf configured to be received in the equipment rack and face the power distribution assembly, the second electrical component including a second electrical power connector extending from the second shelf, the second electrical power connector including a second monitoring device, wherein the monitoring device communicates with the second monitoring device.

20. The electrical device of claim 19, wherein the monitoring device communicates with the second monitoring device through the power distribution assembly.

* * * * *